United States Patent
Wang et al.

(10) Patent No.: US 8,053,698 B2
(45) Date of Patent: Nov. 8, 2011

(54) MONITORING AND REPAIR METHOD FOR ADHESIVE BONDING

(75) Inventors: Pei-Chung Wang, Troy, MI (US); John D. Fickes, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1003 days.

(21) Appl. No.: 11/947,888

(22) Filed: Nov. 30, 2007

(65) Prior Publication Data

US 2008/0128394 A1   Jun. 5, 2008

Related U.S. Application Data

(60) Provisional application No. 60/868,097, filed on Dec. 1, 2006.

(51) Int. Cl.
   *B23K 11/00* (2006.01)
   *B23K 11/10* (2006.01)

(52) U.S. Cl. .............. 219/117.1; 219/91.2; 219/91.21; 219/91.22

(58) Field of Classification Search ........... 219/91.2, 219/91.21, 91.23, 92, 117.1, 118
   See application file for complete search history.

(56) References Cited

U.S. PATENT DOCUMENTS

| | | | | |
|---|---|---|---|---|
| 5,558,785 A | * | 9/1996 | Killian et al. | 219/110 |
| 5,662,763 A | * | 9/1997 | Yamanaka | 156/358 |
| 6,342,686 B1 | | 1/2002 | Farrow | 219/109 |
| 6,506,997 B2 | | 1/2003 | Matsuyama | 219/110 |
| 6,903,298 B2 | | 6/2005 | Wang et al. | 219/110 |
| 2005/0217785 A1 | * | 10/2005 | Hable et al. | 156/60 |

FOREIGN PATENT DOCUMENTS

| | | | | |
|---|---|---|---|---|
| DE | 3811834 A | * | 10/1988 | |
| JP | 01188578 A | * | 7/1989 | |
| JP | 11010356 A | * | 1/1999 | |
| JP | 11077324 A | * | 3/1999 | |
| JP | 2003019570 A | * | 1/2003 | |

* cited by examiner

*Primary Examiner* — Stephen Ralis

(57) ABSTRACT

A method for monitoring the presence of an adhesive between two metal workpieces includes measuring the depth of indentation made by electric resistance weld electrodes by measuring the advance of the weld electrodes, and comparing the measured depth of indentation with the depth of indentation that is known to occur when the presence of the adhesive between the metal workpieces minimizes the shunting of weld current and thereby affects the depth of indentation. If the adhesive is absent, a supplemental electric resistance weld is made to compensate for the absent adhesive. The invention is applicable to both adhesive bonding, where only adhesive is used to attach the workpieces, and weldbonding, where an electric resistance weld is made atop a layer of adhesive.

9 Claims, 2 Drawing Sheets

MONITORING AND REPAIR METHOD FOR ADHESIVE BONDING

This application claims priority of U.S. Provisional Patent Application 60/868,097, filed Dec. 1, 2006.

FIELD OF THE INVENTION

The present invention relates to joining workpieces of metal by adhesive bonding and electric resistance welding, and more particularly a method for monitoring and repairing such joints.

BACKGROUND OF THE INVENTION

It is known to place a bead of adhesive between two workpieces of metal and to then make an electric resistance weld through the adhesive layer. The adhesive provides a seal between the workpieces and also contributes to the strength of the welded joint. This process of using both adhesive and electric resistance welding is commonly called weldbonding.

It is also known to place a bead of adhesive between two workpieces and then rely upon the adhesive to attach the workpieces together. This process is commonly called adhesive bonding.

It is known to use visual inspection, a camera, or a laser to monitor the placement of the adhesive so that the process can be stopped or corrected if the adhesive is missing or misplaced.

It would be desirable to provide a new and improved method for monitoring the presence or absence of the adhesive and then making repairs and process corrections if needed.

SUMMARY OF THE INVENTION

The invention provides a method for monitoring the presence of an adhesive between two metal workpieces including indenting the workpieces via applying weld electrodes to the workpieces and measuring the depth of indentation made by the weld electrodes by measuring the advance of the weld electrodes, and comparing the measured depth of indentation with the depth of indentation that is known to occur when the presence of the adhesive between the metal workpieces minimizes the shunting of weld current and thereby affects the depth of indentation to thereby determine the presence or absence of the adhesive.

In addition, a method is provided for attaching together metal workpieces by electric resistance weldbonding with adhesive and includes dispensing an adhesive on a lower workpiece, placing an upper workpiece atop the lower workpiece, and making a series of electric resistance welds at predetermined spaced locations along the workpieces. The depth of indentation of each of the series of electric resistance welds is determined by measuring the advance of the weld electrodes and comparing the measured depth of indentation with the depth of indentation that is known to occur when there is the presence of the adhesive between the metal workpieces. In the event of finding that the depth of indentation is not consistent with the weld having been made at the presence of the adhesive, the weld electrodes are relocated to make at least one supplemental resistance weld in addition to the predetermined welds.

Furthermore, a method is provided for attaching together metal workpieces with an adhesive, including dispensing an adhesive on a lower workpiece, and placing an upper workpiece atop the lower workpiece. Electrodes are pressed against to the workpieces and current passed there through to make an indentation, and the depth of indentation is determined by measuring the advance of the electrodes. The measured depth of indentation is compared with the depth of indentation that is known to occur when there is the presence of the adhesive between the metal workpieces. If it is determined that the adhesive is not present, then a greater current is applied for a duration sufficient to make a supplemental electric resistance weld to attach together the workpieces.

DETAILED DESCRIPTION OF THE EXEMPLARY EMBODIMENTS

The following description of certain exemplary embodiments is merely exemplary in nature and is not intended to limit the invention, its application, or uses.

Figure 1:
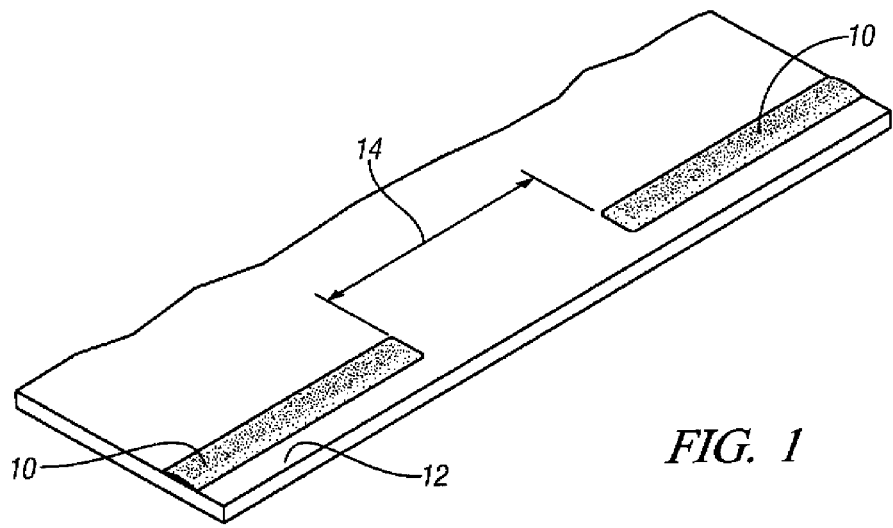
FIG. 1 is a perspective view of a lower metal workpiece having a bead of adhesive dispensed along the length thereof, with the bead being interrupted by an unintended gap in the adhesive.

In FIG. 1, a bead of adhesive 10 is placed upon a lower metal workpiece 12. The bead of adhesive 10 is placed via conventional adhesive dispensing equipment which may include a robot or other automated dispensing mechanism. In FIG. 1, the bead of adhesive 10 is shown to have a gap 14. The gap 14 results from a dispensing error, such as a fault in the dispenser.

Figure 2:
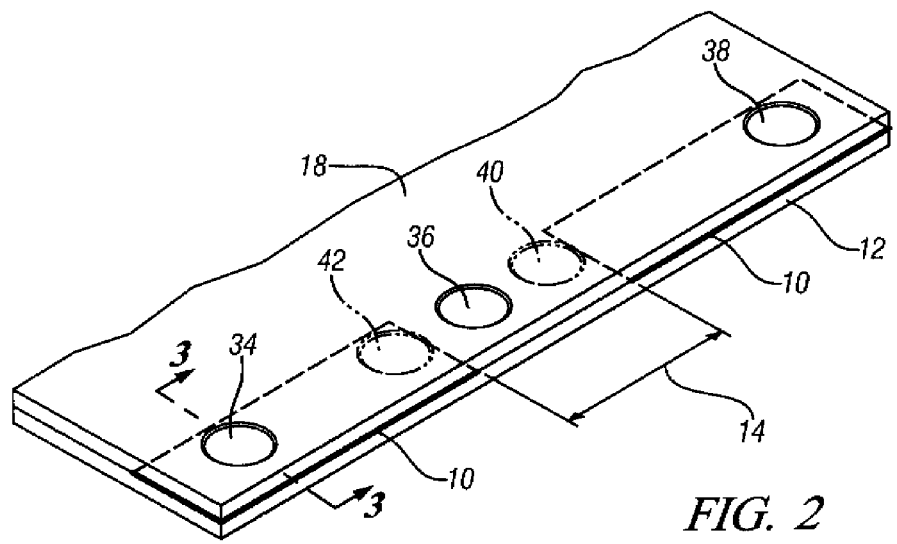
FIG. 2 is a view similar to FIG. 1 but showing that an upper metal workpiece has been laid atop the first metal workpiece and a series of electric resistance welds have been made along the length of the workpieces to join the workpieces together via both adhesive bonding and electric resistance welding.

As seen in FIG. 2, an upper metal workpiece 18 is placed atop the lower metal workpiece 12, so that the adhesive 10 is flattened. As seen in FIG. 2, the adhesive 10 is spread between the upper workpiece 18 and lower workpiece 12, but is missing at gap 14.

Figure 3:
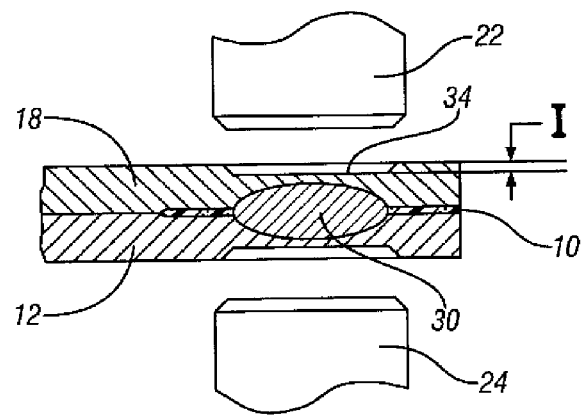
FIG. 3 is a section view taken through a typical weld.

As seen in FIG. 3, a squeeze-type electric resistance welder is then employed to squeeze the metal workpieces together and make an electric resistance spot weld. The welder has an upper electrode 22 that is brought into contact with the upper metal workpiece 18 and a lower backup electrode 24 that is brought into contact with the lower metal workpiece 12. Electric current is applied to the electrodes 22 and 24 and one or both of the electrodes 22 and 24 are advanced by a servomotor to form an electric resistance weld nugget 30. During the welding process the electrodes 22 and 24 displace the softened surface of the metal workpieces 12 and 18 and make a weld indentation. The depth of the weld indentation, indicated at "I" in FIG. 3, can be measured by instrumenting the servomotor to measure the advance of the electrodes 22 and 24 into the metal workpieces.

Referring again to FIG. 2, it is seen that the welder is programmed to make a series of welds along the edges of the workpieces 12 and 18. The series of programmed welds include a first weld 34, a next weld 36, and a final weld 38 at the end of the workpieces.

Since the adhesive 10 is an insulator, the presence of the adhesive 10 layer in between the metal workpieces 12 and 18 minimizes the weld current shunting and the electric current is concentrated. Thus, we have found that the depth of the weld indentation "I" correlates with the presence or absence of the adhesive 10. That is, for a given squeeze pressure and electric current, the depth of the indentation will be within a certain range if the adhesive 10 is present, but the depth of the indentation will fall outside of that range if the weld was formed in that region where there is a gap 14 in the placement of the adhesive 10.

Figure 4:
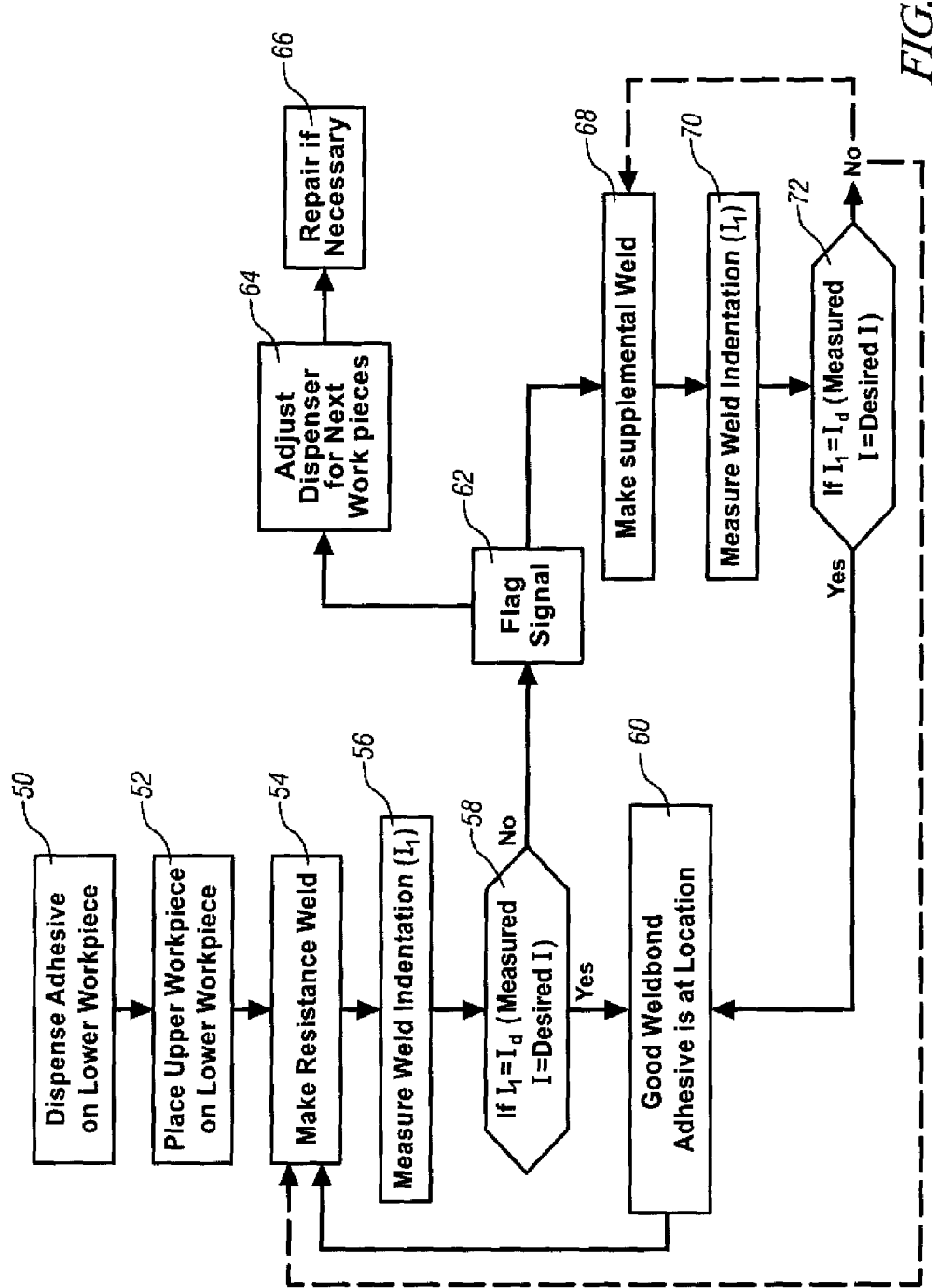
FIG. 4 is a flow chart showing the steps of a method for monitoring and repairing the process of making the series of electric resistance welds shown in FIG. 2.

Referring to FIG. 4, an algorithm flow chart is shown for monitoring the process and making supplemental repair welds, such as welds 40 and 42 of FIG. 2, in the event that an adhesive gap is detected.

In FIG. 4, the adhesive 10 is dispensed at step 50, the upper workpiece is placed atop the lower workpiece at step 52, the first electric resistance weld 34 is created at step 54, and the weld indentation "$I_1$" is measured at step 56.

At step 58, the measured indentation "$I_1$" is compared with the desired indentation "$I_d$" that is known to occur when the adhesive 10 is present and a good quality weldbond is therefore made. Step 60 shows that once it is found that the measured indentation "$I_i$" is statistically equivalent to (or in the range of) the desired indentation "$I_d$", it can be assured that a good weldbond has been made atop the adhesive 10 and the desired condition of making the resistance weld and the adhesive bond at the same location has been achieved. Accordingly, the process returns to step 54 to make the next weld 36.

If the measured indentation "$I_1$" at step 56 for weld 36 is compared at step 58 and found to be statistically different than the desired indentation "$I_d$", then it is known that the adhesive 10 is missing or misplaced and an alarm or flag is raised at 62. In response to this alarm, the adhesive dispenser can be adjusted, step 64, and repaired, step 66, so that a gap in the adhesive will be prevented in the weldbonding of the next set of workpieces to be joined.

In addition, when step 58 determined that the weld 36 has been made without the presence of the adhesive 10 due to the gap 14, the resistance welder can leave the preprogrammed path which would take it to the next weld 38. Instead the resistance welder will move to a new location relatively closer to the weld 36 and make a supplemental weld. For example, in FIG. 2, a supplemental weld 40 can be made adjacent to the weld 36. The indentation of this new supplemental weld 40 is measured at step 70 and compared with the desired indentation "$I_d$" at step 72, to confirm that the supplemental weld 40 has been made at the proper location atop the adhesive 10. If it is determined that the supplemental weld 40 has also been performed at the gap 14, then an additional supplemental weld 42 can be made on the opposite side of the weld 36 from the supplemental weld 40.

It will be understood that the number of supplemental welds to be made can be a single supplemental weld or multiple supplemental welds. For example, it may be that a single supplemental weld, whether it is made at the location of adhesive 10 or at the location of a gap 14 will sufficiently strengthen the workpieces so that no additional supplemental welds will be needed. Thus, after making the single supplemental weld, the process can return directly to step 54 where the resistance welder will proceed to the location at which the next of the preprogrammed welds is to be made.

As an alternative to the weldbonding method described above, the method of this invention may also be applied in the adhesive bonding together of metal sheets. Referring again to FIG. 4, at step 54, the weld electrodes 22 and 24 are pressed to the workpieces and then a current is applied at a lesser level and duration than would be applied to create an electric resistance weld. The indentation is measured and compared to determine the presence or absence of the adhesive. If the adhesive is absent, then greater current and duration is applied to create an electric resistance weld to form the attachment in lieu of the absent adhesive. The electrodes can be moved along the workpieces to make any number of supplemental electric resistance welds assure attachment at locations where the adhesive is not present. In addition, the adhesive dispenser can be adjusted or repaired if the adhesive is not present.

The foregoing description of the invention is merely exemplary in nature and, thus, variations thereof are intended to be within the scope of the invention. It will be appreciated that this method of monitoring the presence of the adhesive by examining the depth of the weld indentation can be used in many process control regimens. For example, if the adhesive is found to be missing or misplaced, it may be that the adhesive dispenser has malfunctioned and the adhesive dispensing equipment can be adjusted and repaired. Or the welding electrodes can be moved around the workpieces making a series of welds to find the location of the adhesive, and then the finished part can be accepted with knowledge that a resistance weld has been made atop the adhesive. If, when the electric resistance weld is made, it is found that the adhesive is present at the proper location, then the mass production process can be continued with confidence that good parts are being made. If the supplemental welds do not find the adhesive, the making of the supplemental welds can be continued until there is confidence that the number of such welds have provided sufficient strength to the weldbonded workpieces. In a product where only adhesive bonding will be used to attach the workpieces, one or more electric resistance weld can be added to the product in those instances where it is determined that the some or all adhesive is absent.

Although the drawing herein show only two sheets, it will be understood that the method herein may also be employed in those situations where three or more sheets are stacked together. In addition, although the example herein is of an adhesive between the stacked sheets, the method may also be employed with a sealer instead of an adhesive, and for that reason, the term adhesive is used herein means materials that are variously referred to as sealers, adhesive-sealers, and adhesives.

What is claimed is:

1. A method for attaching together upper and lower metal workpieces with an adhesive comprising;
    dispensing the adhesive on the lower metal workpiece,
    placing the upper metal workpiece atop the lower metal workpiece;
    applying weld electrodes to the upper and lower metal workpieces and passing a current between the weld electrodes to make a series of electric resistance welds at predetermined spaced locations along the upper and lower metal workpieces;
    measuring a depth of indentation of each of the series of electric resistance welds at the predetermined spaced locations by measuring an advance of the weld electrodes and comparing the measured depth of indentation with a known depth of indentation that is known to occur when there is a presence of the adhesive between the upper and lower metal workpieces;
    and, in the event of finding at least one of the series of electric resistance welds has been made without the presence of the adhesive, relocating the weld electrodes and advancing the electrodes to make at least one supplemental electric resistance weld in addition to the series of electric resistance welds made at the predetermined spaced locations.

2. The method of claim 1 further comprising the at least one supplemental weld being more than one supplemental electric resistance welds, and the supplemental electric resistance welds being made until the presence of adhesive is confirmed.

3. The method of claim 2 further comprising making the more than one supplemental electric resistance welds on opposite sides of those of the series of electric resistance welds that did not occur at the presence of adhesive.

4. The method of claim 1 further comprising making, adjacent to the each of the series of predetermined electric resistance weld that did not occur at the presence of adhesive, the at least one supplemental electric resistance welds in a number that is sufficient to join the upper and lower metal workpieces irrespective of an absence of the adhesive.

5. The method of claim 1 further comprising the adhesive being dispensed by a dispenser, and in the event of finding at least one of the series of electric resistance welds having been made without the presence of the adhesive, then adjusting or repairing the adhesive dispenser.

6. The method of claim 1 further comprising measuring a depth of indentation of each of the at least one supplemental electric resistance welds by measuring the advance of the weld electrodes and comparing the measured depth of indentation with the known depth of indentation that is known to occur when there is the presence of the adhesive between the upper and lower metal workpieces.

7. A method for attaching together upper and lower metal workpieces with an adhesive, comprising;

dispensing an adhesive on the lower metal workpiece, placing the upper metal workpiece atop the lower metal workpiece;

advancing the electrodes to press the electrodes into the upper and lower metal workpieces and passing current there through to make an indentation;

measuring a depth of indentation by measuring the advance of the electrodes and comparing the measured depth of indentation with a known depth of indentation that is known to occur when there is the presence of the adhesive between the upper and lower metal workpieces;

and, in the event of finding a lack of presence of the adhesive, applying a higher current to the electrodes to create a supplemental electric resistance weld to attach together the upper and lower metal workpieces irrespective of the lack of presence of the adhesive.

8. The method of claim 7 further comprising making additional supplemental electric resistance welds until the presence of adhesive is confirmed.

9. The method of claim 7 further comprising the adhesive being dispensed by a dispenser, and, in the event of finding a lack of presence of the adhesive, then adjusting or repairing the adhesive dispenser.

* * * * *